March 7, 1967  R. J. OLANDER  3,307,422
ADJUSTABLE LEVER MOUNT
Filed March 24, 1965  2 Sheets-Sheet 1

INVENTOR.
Roland J. Olander
BY Edward N. Jurow
Atty.

INVENTOR.
Roland J. Olander

United States Patent Office 3,307,422
Patented Mar. 7, 1967

3,307,422
ADJUSTABLE LEVER MOUNT
Roland J. Olander, La Grange, Ill., assignor to W. H. Miner, Inc., Chicago, Ill., a corporation of Delaware
Filed Mar. 24, 1965, Ser. No. 442,433
4 Claims. (Cl. 74—548)

This invention relates to improvements in freight conveyance or container door latching arrangements and more particularly to improved means for fixing an adjustably mounted handle assembly on the rotary locking member of a freight conveyance door latching arrangement.

In truck trailers, railway freight cars, containers, or the like, an elongated locking member is rotatably mounted on one of the doors. Latching fingers or cams, attached to opposite ends of the locking member, engage keepers mounted on the car or container body to latch the door in response to rotation of the bar in one direction and to disengage therefrom on rotation of the bar in the opposite direction. The rotary locking member is controlled by a handle or lever which is generally attached by welding or riveting a lever pivot or mount onto the bar. Variations in assembly procedure of the body and the door and door frame sometimes cause misalignment of the parts and a relocation of the lever attachment longitudinally or radially is necessary. This is accomplished by removing the weld or rivet and can result in a mutilation of the parts involved.

The present invention is concerned with providing an arrangement which will permit the handle to be adjusted over a continuous range and then rigidly fix it in its adjusted position with ease and without mutilation of parts.

Briefly, the invention solves this problem by providing a pair of wedges for the handle assembly. The wedges are moved past each other when the handle is in its adjusted position to force one of the wedges and the lever mount carrying the handle into rigid engagement with the locking member whereby to hold the handle assembly rigidly in its adjusted position.

It is therefore one object of the present invention to provide an improved arrangement for adjustably mounting a handle on the rotary locking member of a freight conveyance latching arrangement.

A further object of the present invention is to provide improved means for more rigidly mounting an adjustable handle assembly of a freight conveyance door latching arrangement on the rotary locking member thereof.

A further object of the present invention is to provide an improved handle assembly which may be adjustably positioned over a continuous range of positions on the rotary locking member of a freight conveyance door latching arrangement and which may be rigidly fixed in any of said positions.

Other objects and features of this invention will more clearly appear upon examination of the following specification and claims together with the attached drawings, wherein:

Figure 1:
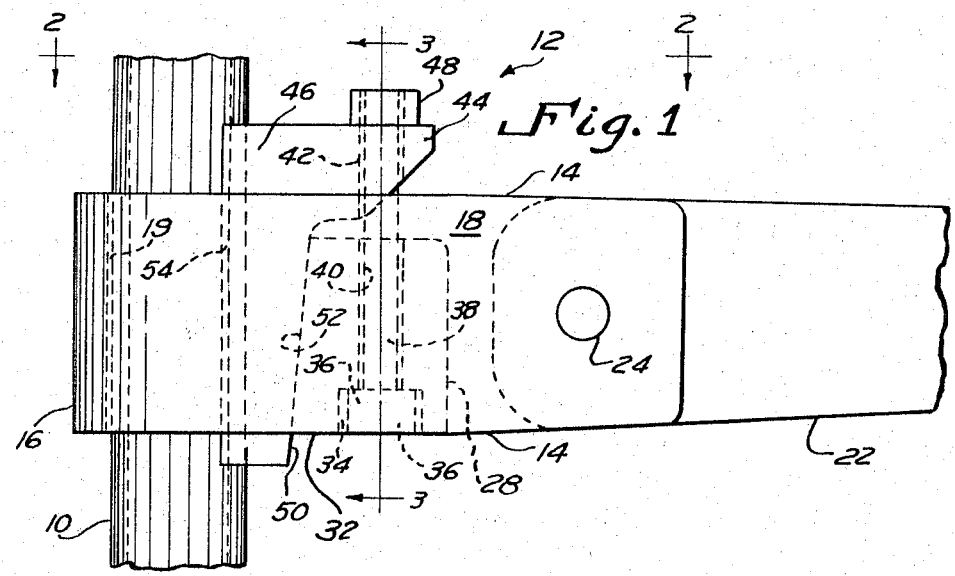
FIG. 1 is a side elevational view of the handle assembly positioned on a locking member with only the relevant portions of the locking member and handle being shown.
Figure 2:
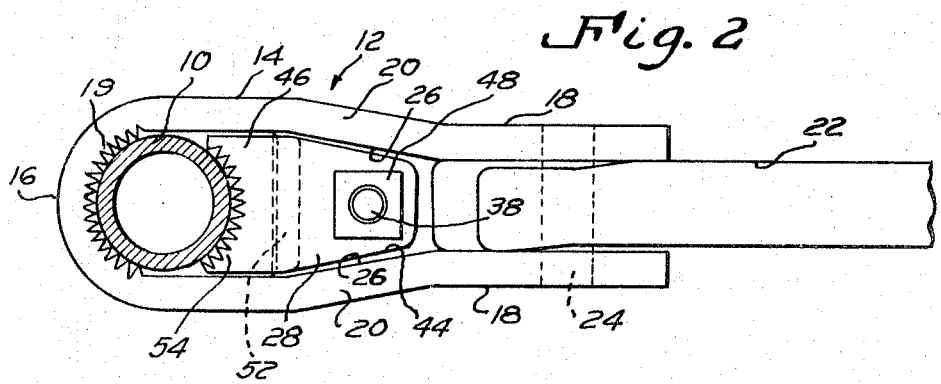
FIG. 2 is a horizontal sectional view taken generally on the line 2—2 of FIG. 1 and looking in the direction of the arrows.
Figure 3:
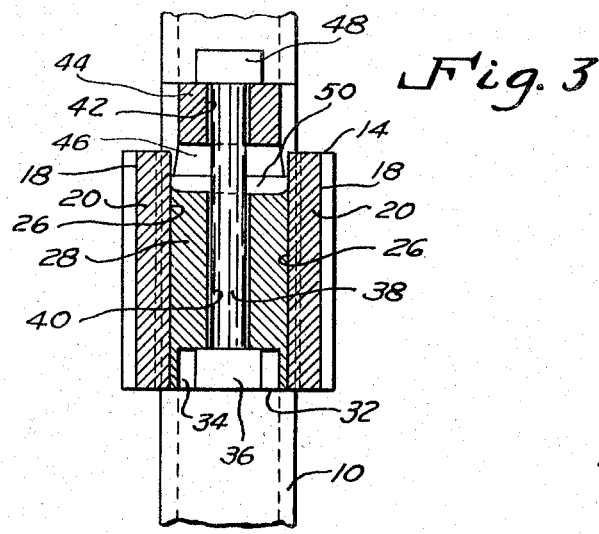
FIG. 3 is a vertical sectional view taken on the line 3—3 of FIG. 1 and looking in the direction of the arrows.

In FIGS. 1–3 of said drawings a rotary locking member or bar is indicated by the reference character 10. The locking member 10, which is a vertically mounted elongated tube having latching fingers or cams (not shown) secured to its opposite ends, is rotatably mounted on the door of a freight conveyance (not shown). Rotation of the locking member 10 by means of an operating handle 22 in one direction causes the latching fingers to engage keepers (not shown) for latching the door while rotation of the member 10 in the opposite direction causes the latching fingers to disengage the keepers and thereby unlatch the door, all in a conventional manner. The handle 22 rotates about the axis of the bar 10 and engages a seal plate (not shown) carried on the door simultaneously with locking engagement of the latching fingers in their keepers.

To perform these operations efficiently an adjustable handle assembly 12 is provided for the locking bar 10. Said handle assembly is comprised of a generally U-shaped lever mount 14 having an arcuate rear leg 16 and a pair of horizontally spaced side legs 18. The rear leg 16 conforms generally to the shape of the elongated rotary locking member 10 and is provided with a series of serrations or knurlings 19 thereon for deforming the surface of the bar 10. The side legs 18 are provided with converging sections 20 intermediate their ends, and a handle 22 is pivotally mounted between said legs adjacent their ends by means of a pin 24.

The converging sections 20 have inner surfaces 26 inclined toward each other between which is secured, as by welding, a wedge block 28 having correspondingly inclined surfaces. The wedge block 28 has an inclined or oblique face 52 facing the serrated portion 19 of the lever mount 14 and a bottom face 32 which is provided with a recess 34 in which is received the head 36 of a bolt 38. The recess 34 is preferably shaped so as to prevent the bolt from rotating. The bolt 38 passes through an aperture 40 in the wedge block 28 and through an aperture 42 located in a lip 44 of a second wedge block 46. A nut 48 is threaded on the end of the bolt 38.

The second wedge block 46 comprises an elongated body section having an oblique or inclined surface 50 which is complementary to and adapted to engage the inclined or oblique face 52 on the first wedge block 28. Opposite the inclined surface 50 the wedge block 46 is provided with an arcuate surface conforming generally to the shape of the bar 10 and provided with serrations 54 which are adapted to engage with one side of the bar 10 for biting engagement therewith. When the wedge block 46 is forced against the bar 10 both groups of serrations 19 and 54 bite into opposite sides of the bar to rigidly interconnect the bar 10 and handle assembly 12.

The lever mount 14 together with the handle 22 is somewhat loosely assembled to the bar 10 in a conventional manner generally before the bar is mounted on the door. After assembly of the bar 10 on the door, the lever mount 14 is slid axially along the bar 10 until the handle 22 is longitudinally positioned as desired. The lever mount 14 is also radially positioned so that the handle 22 may be rotated into engagement with the usual seal plate which may be located on either side of the bar 10. The latching fingers at the end of the bar 10 will also be simultaneously engaged with their keepers so that both the handle 22 and latching fingers are in their limit positions.

The second wedge block 46 is then assembled to the lever mount 14 between the bar 10 and the wedge block 28 and is struck several blows with a hammer or other instrument to force the serrations 19 and 54 into the bar 10 and deform the bar whereby the lever mount becomes rigidly connected to the bar. The bolt 38 is then inserted through the apertures 40 and 42 and the nut 48 is tightly threaded thereon to prevent the serrations from being jarred loose from the bar 10.

It will be noted that since the wedge block 28 is welded to the lever mount 14, horizontal movement of the wedge block 46 is confined to the small distance necessary for the serrations 19 and 54 to deform the bar 10 thus preventing misalignment of the apertures 40 and 42.

In the event the handle 22 need be repositioned, the nut 48 is loosened and the lower end of the wedge block 46, which protrudes below the mount 14, is struck several hammer blows to disengage it from the bar 10. The mount 14 may then be repositioned, whereafter the tightening procedure is repeated with the handle in its newly adjusted position.

Figure 4:
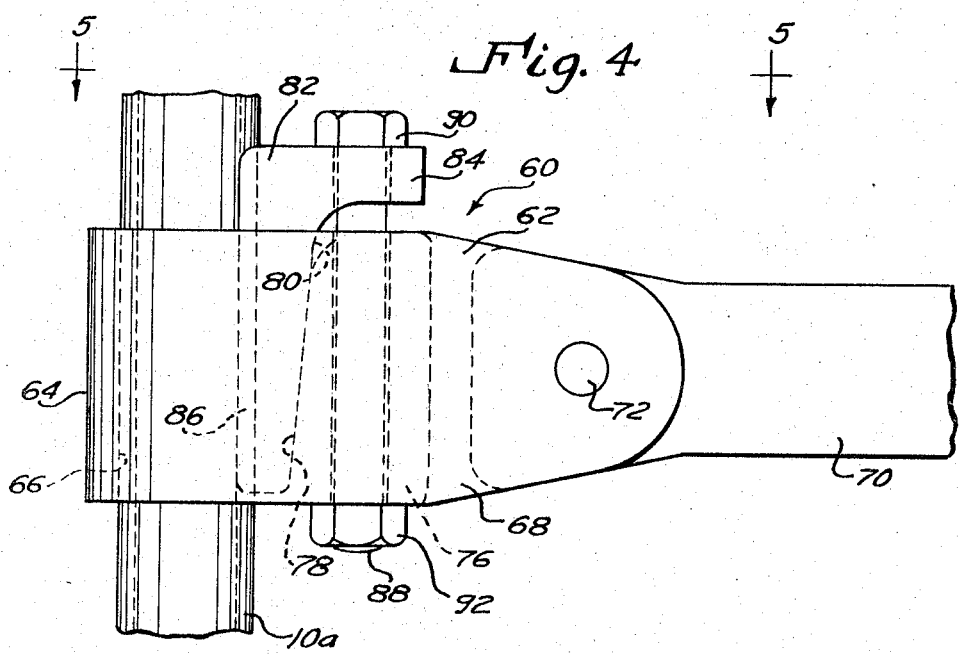
FIG. 4 is a side elevational view of another embodiment of the handle assembly of the present invention.
Figure 5:
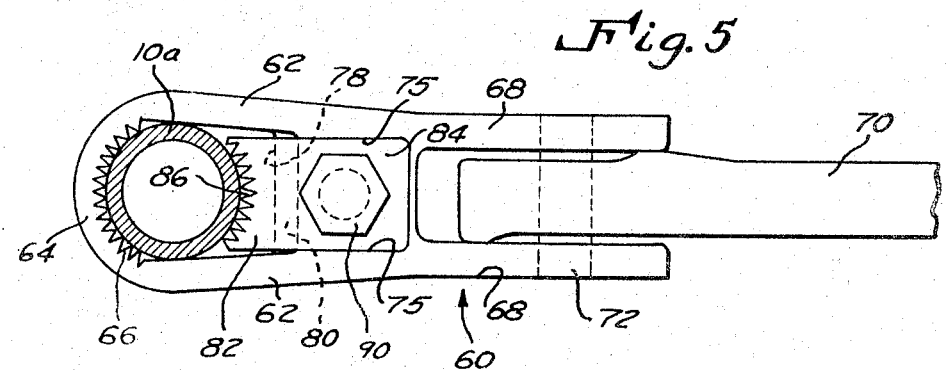
FIG. 5 is a horizontal sectional view taken generally on the line 5—5 of FIG. 4 and looking in the direction of the arrows.

In the embodiment shown in FIGS. 4 and 5, the locking bar is identified by the reference character 10a and the handle assembly is identified by the reference character 60. The handle assembly 60 comprises a U-shaped lever mount 62 having a rear leg 64 whose inner surface is provided with serrations 66 similar to the serrations 19 of FIG. 2. The two side legs 68 are provided for the lever mount 62 and a handle 70 is pivotally mounted between their ends by means of a pin 72.

In this embodiment the side legs 68 are provided with parallel vertical inner surfaces 75 between which is secured, as by welding, a wedge block 76 which has corresponding parallel vertical surfaces. The wedge block 76 extends the full height of the lever mount 62 and has an inclined or oblique face 78 which is complementary to and adapted to engage a surface 80 on a second wedge block 82.

The second wedge block 82 is provided with a lip 84 which overlaps the first wedge block 76 and is also provided with an arcuate face having a plurality of serrations or knurlings 86 thereon for deformably engaging the bar 10a.

A bolt 88 having a head 90 extends through the lip 84 on wedge block 82 and through the first wedge block 76. A nut 92 is threaded on the lower end of the bolt 88 for fastening the wedge block 82 in its bar engaging position as explained previously for the embodiment shown in FIGS. 1–3.

The handle assembly 60 is assembled as explained for the previous handle assembly 12 and the handle 70 and lever mount 62 are positioned on the bar 10a as previously described. If it is necessary to reposition the lever mount and handle either axially or radially, the nut 92 is loosened and the wedge block 82 is disengaged. The mount 62 may then be repositioned, whereafter the tightening procedure is repeated as previously described.

It will be understood that certain changes may be made in the construction or arrangement of the adjustable lever mount disclosed herein without departing from the spirit and scope of the invention as defined in the appended claims.

What is claimed as new is:

1. An arrangement for mounting a handle assembly on a rotary locking bar of a freight conveyance door latching arrangement in a manner such that said handle assembly may be adjustably positioned and repositioned both axially and radially on the locking bar, the improvement comprising a U-shaped lever mount partially encircling said bar and having a pair of side legs extending away therefrom, said lever mount being adapted to be adjustably moved both axially along and radially about the axis of said bar, a serrated inner surface on the portion of said mount partially encircling said bar, a handle supported between said side legs of said mount adjacent the ends of said side legs, a first wedge block secured between said side legs intermediate said handle and said bar and having a first vertically inclined wedge face directed toward and spaced from said bar, and a second wedge block having a serrated vertical surface for engagement with said bar and a complementary vertically inclined wedge surface in engagement with said first wedge face whereby pressure applied to said second wedge block in a wedging direction forces said serrated surfaces of said mount and said second wedge block into tight gripping engagement with said bar.

2. The arrangement recited in claim 1 in which said second wedge block is provided with a horizontal lip overlapping said first wedge block whereby said second block is adapted to be driven downward for wedging engagement with said first wedge block.

3. The arrangement recited in claim 2 in which a bolt is adapted to be tightened between said first wedge block and said overlapping lip of said second wedge block whereby to prevent disengagement of said second wedge block and inadvertent loosening of said handle assembly.

4. An arrangement for mounting a handle assembly on a rotary locking bar of a freight container door latching arrangement in a manner such that said handle assembly may be adjustably positioned and repositioned both axially and radially on the locking bar, the improvement comprising a U-shaped lever mount partially encircling said bar and having a pair of side legs extending away therefrom, said lever mount being adapted to be adjustably moved both axially along and radially around the axis of said bar, a serrated inner surface on the portion of said mount partially encircling said bar, converging inner surfaces on said side legs of said U-shaped mount located intermediate the ends of the side legs, a handle pivotally supported between said side legs adjacent their ends, a first wedge block secured between said converging surfaces of said side legs and having a first vertically inclined wedge face directed toward and spaced from said bar, a second wedge block having a serrated arcuate surface for engagement with said bar and a vertically inclined wedge face tapered at a complementary angle to said first wedge face whereby said second wedge block is adapted to be driven in a wedging direction to force said serrated surfaces of said mount and said second wedge block into tight gripping engagement with said bar, and releasable means for thereafter rigidly interconnecting said wedge blocks to prevent inadvertent loosening of said handle assembly on said locking bar.

References Cited by the Examiner

UNITED STATES PATENTS 1,227,219   5/1917   Thysell _____ 81—128

FOREIGN PATENTS 7,440   3/1879   Germany.

FRED C. MATTERN, Jr., *Primary Examiner.*

W. S. RATLIFF, *Assistant Examiner.*